United States Patent [19]

Dieterich et al.

[11] Patent Number: 4,757,467

[45] Date of Patent: Jul. 12, 1988

[54] APPARATUS FOR ESTIMATING THE SQUARE ROOT OF DIGITAL SAMPLES

[75] Inventors: Charles B. Dieterich, South Brunswick Township, Middlesex County, N.J.; Todd J. Christopher, Indianapolis, Ind.

[73] Assignee: RCA Licensing Corporation, Princeton, N.J.

[21] Appl. No.: 863,431

[22] Filed: May 15, 1986

[51] Int. Cl.⁴ .............................................. G06F 7/52
[52] U.S. Cl. .................................................. 364/752
[58] Field of Search ........................................ 364/752

[56] References Cited

U.S. PATENT DOCUMENTS

| | | | |
|---|---|---|---|
| 4,298,951 | 11/1981 | Hall | 364/752 |
| 4,477,879 | 10/1984 | Wong | 364/752 |
| 4,503,549 | 3/1985 | Slabinski | 364/752 |
| 4,700,319 | 10/1987 | Shiner | 364/752 |

OTHER PUBLICATIONS

OST Bulletin No. 60-Office of Science and Technology-Appendix II.

Leslie B. Tyler et al., "A Companding System for Multichannel TV Sound", IEEE Trans. on Consumer Electronics, vol. CE 30, No. 4, Nov. 1984, pp. 633-640.

C. T. Fike, Computer Evaluation of Mathematical Functions, Prentice-Hall Inc., Englewood Cliffs, N.J., 1968, pp. 22-31.

Primary Examiner—Gary V. Harkcom
Assistant Examiner—Dale M. Shaw
Attorney, Agent, or Firm—Eugene M. Whitacre; Paul J. Rasmussen; Eric P. Herrmann

[57] ABSTRACT

Circuitry for calculating the square root of a binary number iterates the equation $E(K+1)=E(K)+(S-E(K)^2)$ where $E(K+1)$ is the current estimate of the square root of the sample S and $E(K)$ is the previous estimate. The value $E(K)^2$ is estimated in order to reduce the complexity of the hardware. An application is described for real time processing of digital audio signals in serial-bit format.

11 Claims, 3 Drawing Sheets

APPARATUS FOR ESTIMATING THE SQUARE ROOT OF DIGITAL SAMPLES

This invention relates to circuitry for estimating the square root of a value represented by binary samples.

Recent developments in very-large-scale-integrated-circuits have made practical real time digital processing of various types of signals that have heretofore been processed with analog circuitry. For example, ITT INTERMETALL INDUSTRIES, Freiburg, W. Germany, has developed the DIGIT 2000 series of circuits for digitally processing baseband video and audio signals in television receivers. The impetus for converting to digital signal processing arises from potential cost savings, inclusion of features which cannot be effectively realized with conventional analog components, and the inherent parametric stability of digital circuits.

Digital processing may be performed with signals formatted as parallel-bit samples or serial-bit samples. There is a basic speed-complexity tradeoff between selecting parallel-bit or serial-bit processing. Parallel-bit circuits, in general, are required for processing wideband signals but are relatively complex. Serial-bit circuits are relatively simple but are relegated to narrower bandwidth signals. For the current state of the art of digital processing, parallel-bit circuitry is required to process video signals in a TV receiver, however, the audio signals may be processed in serial-bit format. For purposes of illustration, the invention will be described in the environment of a portion of a digital audio processing circuit of a TV receiver capable of producing stereo sound. It is to be understood, however, that the invention is not limited to audio processing.

In a stereo-sound TV receiver the broadcast sound signal is a composite signal including a (L+R) or monaural signal and a (L−R) stereo component signal. The broadcast (L−R) component is compressed to enhance its signal-to-noise ratio and therefore must be expanded in the receiver to properly reproduce the original sound signals.

The system currently utilized in the United States was selected by the Electronic Industries Association (EIA) under the auspices of its Broadcast Television Systems Committee (BTSC). The parameters of the system are documented by the Office of Science and Technology in the OST Bulletin No. 60. A general system description may be found in an article by Leslie B. Tyler et al. entitled "A Companding System For Multichannel TV Sound", IEEE Transactions on Consumer Electronics, Vol. CE-30, No. 4, November 1984, pp. 633–640.

The BTSC system performs companding on the stereo audio difference (L−R) signal, and the secondary audio signals. The companding involves spectral compression/expansion and wide-band amplitude compression/expansion. Signal compression and expansion are complementary functions. Compression is performed by a process of detecting the RMS value of the signal and limiting the frequency response and amplitude of the compressed signal as a function of the RMS value prior to broadcasting. Expansion on the other hand involves detecting the RMS value of the received compressed signal and emphasizing and amplifying the compressed signal as a function of the detected RMS value to substantially restore the signal to its original form.

From the foregoing, it is apparent that the receiver must include an RMS detector. A straight-forward RMS detector, for processing sampled data or digital signals, includes apparatus to square the samples representing the compressed signal, to average the squared samples over time, and to take the square root of the averaged values.

Digital sound signals are typically represented in digital format with samples having relatively wide bit-width. For example, analog sound samples are digitized to 14–16 bit samples. Arithmetically processing the samples will tend to increase the number of bits per sample as the respective samples course through the processing system. The process of separating the (L−R) component from the composite sound signal, and demodulating the separated (L−R) component, may extend the bit-width of this signal component to, for example, 20 bits.

Conventionally there are two methods used for determining the square roots of digital signals. The first method utilizes a look up table or ROM wherein the values for which the square roots are desired are applied as address codewords to the ROM. The ROM is programmed at each address location to output the square root of the applied address codeword. For any n-bit binary number (n even) it is known that the square root can have only half as many bits as the number, that is n/2 bits. In the case of 20-bit digital audio samples, a ROM implemented to provide the square root function will have in the order of $2^{20} \times 10$ or 10.48 M-bits of storage. The cost of such a ROM precludes its use for e.g. television audio systems.

The second conventional method for determining the square roots of digital signals is an iterative technique referred to as Newton's Method. This method iterates the equation $$E_{R+1} = E_R - \tfrac{1}{2}(E_R - S_R/E_R) \tag{1}$$

where $E_{R+1}$ is the current estimate of the square root of the sample value $S_R$ and $E_R$ is the previous estimate of the square root.

Equation (1) is iterated until the quantity in parenthesis converges to a sufficiently small value. Processing equation (1) requires division of the sample value $S_R$ by successive estimates $E_R$. Division of digital samples is a relatively complex process that does not lend itself to parts-efficient signal processing hardware.

In accordance with the present invention a cost effective square root apparatus is described which minimizes the amount and complexity of hardware required. A particularly advantageous circuit for calculating the square root of real time digital serial-bit audio signals in a BTSC expander is also described.

SUMMARY OF THE INVENTION

Square root circuitry according to the present invention includes a storage element for storing successive estimates of the square root of digital samples. A squaring circuit is coupled to the storage element for squaring the estimates. The estimate, the square of the respective estimate and the digital sample for which the square root is sought are coupled to combining means which combine the estimate and one-half the value of the digital sample in a first polarity sense with one-half the value of the square of the estimate in the opposite polarity sense to produce a further refined estimate of the square root of the sample.

DETAILED DESCRIPTION

Figure 1:
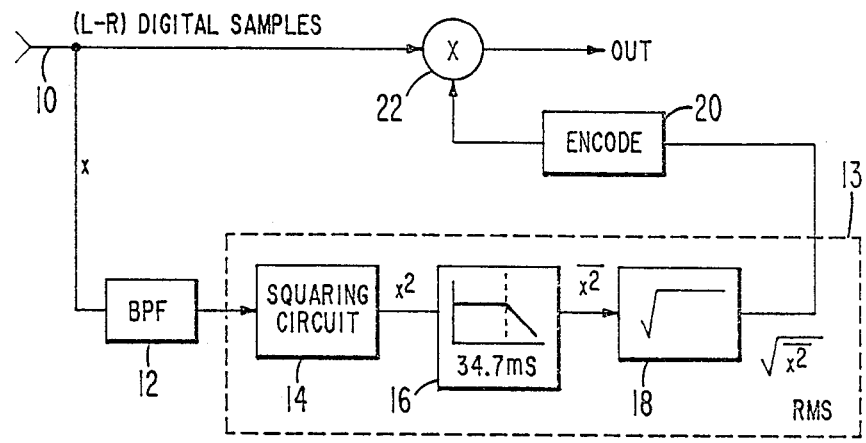
FIG. 1 is a block diagram of circuitry for expanding a compressed audio signal component in a multichannel sound TV receiver wherein the invention may be utilized.

FIG. 1 illustrates circuitry which may be utilized in a multichannel TV sound television receiver for performing wideband expansion of the audio stereo difference signal and wherein the invention may be advantageously implemented. The stereo difference (L−R) signal, which may be derived from a synchronous AM demodulator (not shown) and assumed to be in digital sampled data format, is applied to input terminal 10. This signal is coupled to the multiplicand input of a multiplier 22 and to the input terminal of a bandpass filter 12. Bandpass filter 12, has lower and upper roll-off frequencies of 35 Hz and 2.1 kHz respectively, to limit the energy sensed by the RMS detector to the dominant energy in most program material. The signal provided by bandpass filter 12 is coupled to the RMS detector 13 including the cascade connection of a squaring circuit, 14, an averaging circuit, 16, and a square root circuit, 18. The RMS value of the bandpass filtered signal is coupled to an encoder 20 which conditions the RMS value for application as a multiplier input to multiplier 22. Encoder 20 may serve different functions depending upon, for example, the design of the particular multiplier 22. If the audio signal is in parallel-bit digital format and the multiplier 22 is a shift-and-add type multiplier, circuit 20 converts the RMS values to multiplier shift control signals corresponding to multiplier signals. Alternatively, if the audio signal is in serial-bit digital format and multiplier 22 is a serial-parallel multiplier, element 20 may simply by a serial-to-parallel converter to translate a serial-bit RMS multiplier sample to a parallel-bit multiplier sample.

Squaring circuit 14 squares the signal applied from the band-pass filter 12 and may be a multiplier having both multiplier and multiplicand input terminals coupled to the band-pass filter 12. Alternatively, it may be circuitry to estimate the square of an applied signal.

Averaging circuit 16 is typically realized with a low-pass filter. The weighting interval recommended in the OST Bulletin No. 60 is approximately 35 msec. and may be realized with a recursive type filter to minimize storage elements. The square root circuit 18 is the subject of this invention.

Figure 2:
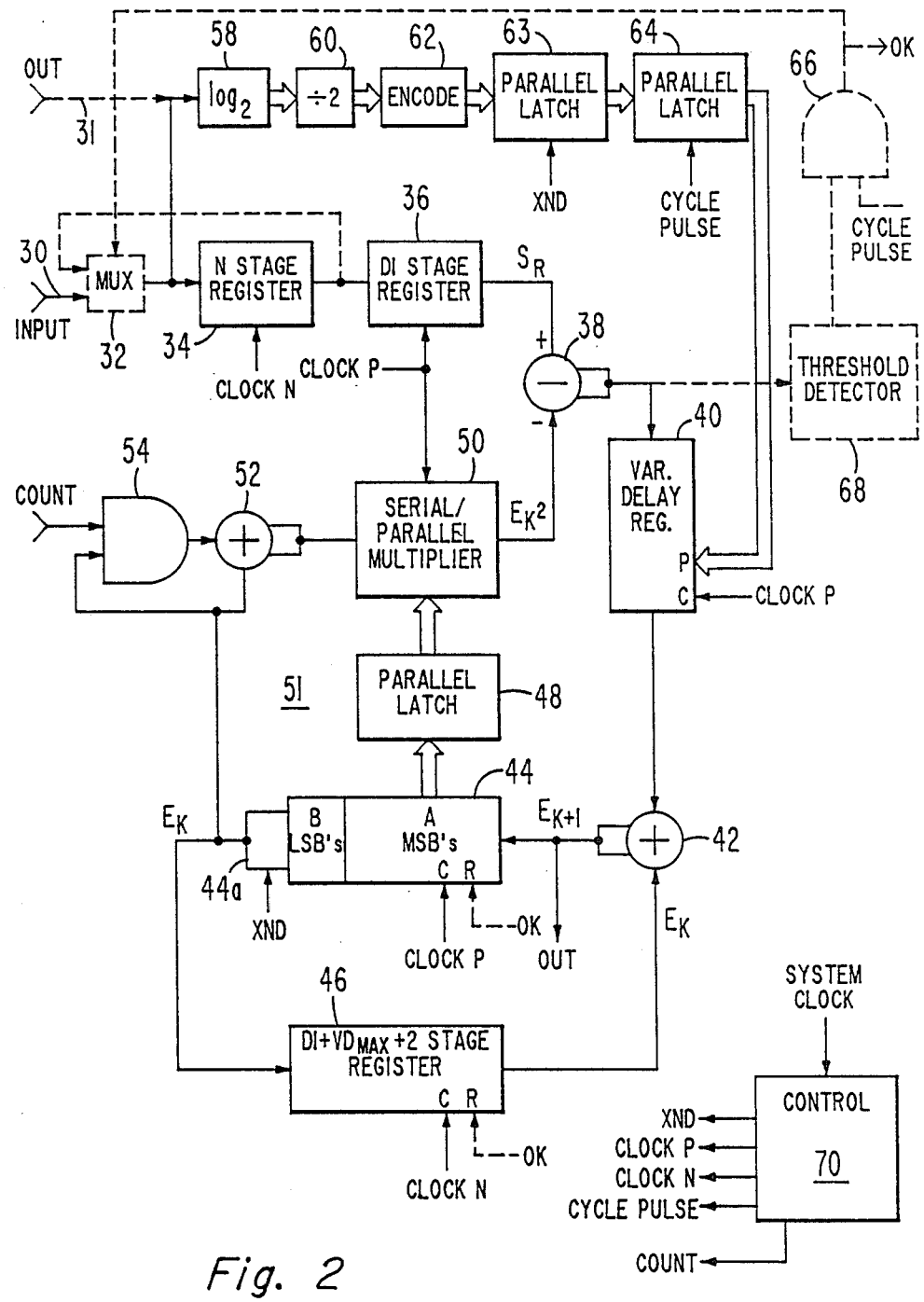
FIG. 2 is a block diagram of apparatus for estimating the square root of serial-bit binary samples embodying the present invention.

FIG. 2 is a serial-bit embodiment of apparatus for calculating the square root of serial-bit binary samples representing the signal and will be described with reference to the waveforms illustrated in FIG. 4. The assumption is made that the apparatus is two's complement circuitry. As such, the most significant bit of the samples is a sign or polarity bit. The samples applied to the square root circuitry are presumed to be all positive since in the expander of FIG. 1 they are derived from the squaring circuit and since the square root of a negative number is invalid. However, within the square root circuitry negative values may be generated and it is therefore necessary to keep track of the polarity of samples internal to the circuit.

Several characteristics of two's complement serial-bit processing will be reviewed at this point. First it is presumed that the two's complement samples occur in time least significant bit (LSB) first and most significant bit (MSB) last. The sign bit is a logic 0 or 1 for positive and negative samples respectively. Second, if the bit width is expanded by replicating the sign bit to more significant bit positions, the value of the bit width expanded sample will be the same as the value of the original sample. Third, delaying or advancing in time, a serial-bit sample by m sample bit periods, has the effect of multiplying and dividing the delayed or advanced sample by $2^m$ respectively, relative to a non-delayed or non-advanced sample. Finally, an N-bit sample may be segmented into L-LSB's of variable value B and (N−L)-MSB's of variable value A such that the sample value may be represented by (A+B).

Figure 4:
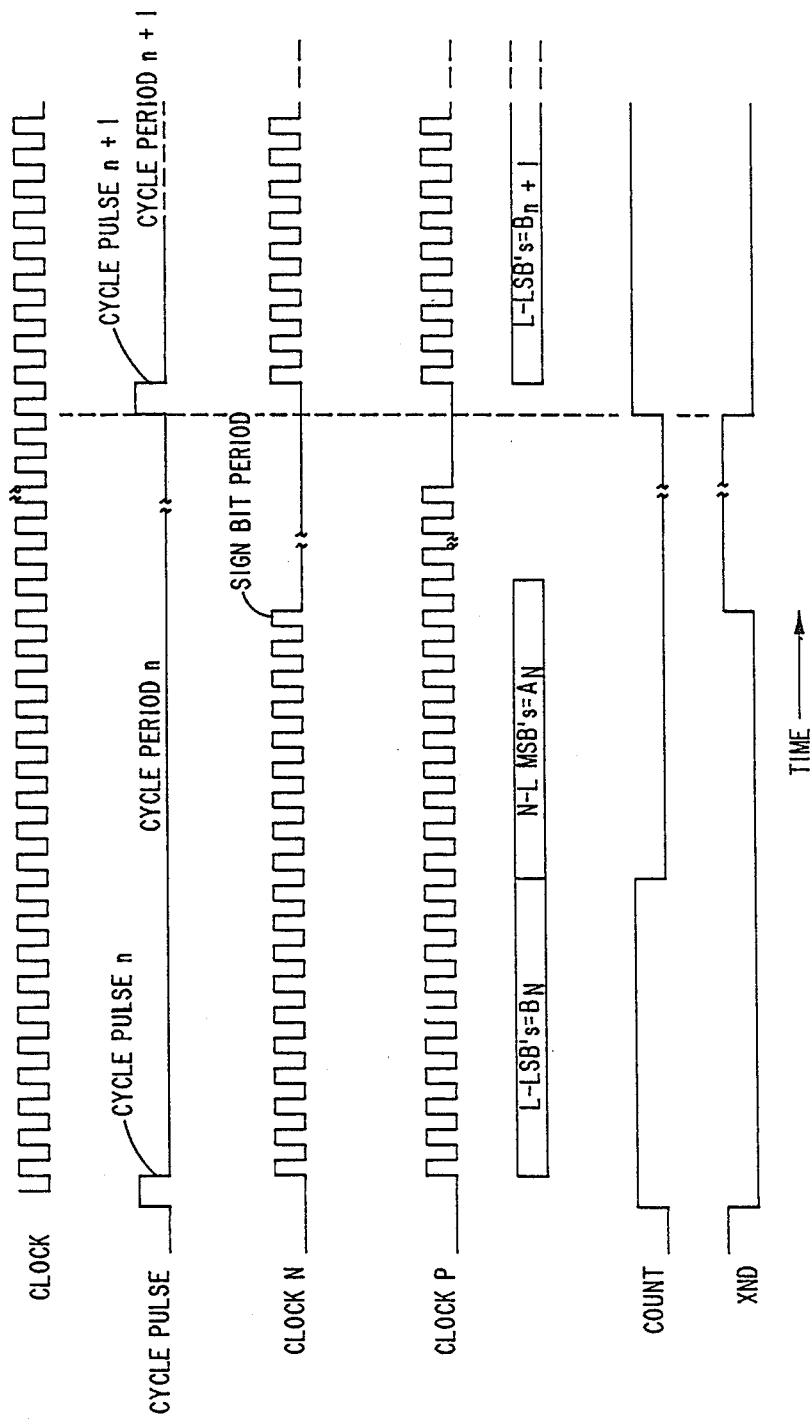
FIG. 4 is a waveform diagram of clock and control signals useful for describing the FIG. 2 apparatus.

Referring now to FIG. 4, time elapses from left to right. The topmost waveform designated CLOCK is the system clock, the pulses of which are synchronous with the occurrence of sample bits and defines the serial sample bit rate. The general technique for calculating the square roots is an iterative technique and, thus, is a sequence of like operations for a particular sample. The waveform designated CYCLE PULSE (C.P.) defines the rate at which the iterations occur, one iteration for each pulse of the waveform C.P. As will be discussed later, for the expander circuitry of FIG. 1, the square root apparatus need only perform one iteration per signal sample so that the cycle rate in that implementation conforms to the serial sample rate.

Serial-bit processing hardware is in general clocked by clocking signals synchronous with the sample bits. Differing arithmetic functions require differing numbers of clock pulses to perform their respective functions. Typically a serial-bit adder arrangement for adding two N-bit serial-bit samples will be clocked by at least (N+1) clock pulses at the sample bit rate, since the maximum value of the sum of two N-bit samples is represented by an (N+1)-bit sample. Alternatively, a multiplier circuit for multiplying an N-bit multiplicand by an (N−L)-bit multiplier must be clocked by at least 2N−L clock pulses to perform the multiplication since the maximum value of such a product is a (2N−L)-bit sample. For the exemplary system illustrated in FIG. 2, respective circuit elements are clocked by one of two clock signals. The first, designated CLOCK N in FIG. 4, is a signal which provides a burst of N pulses per CYCLE PULSE period. The second, designated CLOCK P, provides a burst of P pulses per CYCLE PULSE period where P is greater than N. Beneath the waveform, CLOCK P, are boxes which represent the relative timing occurrence of the L-LSB's and (N−L)-MSB's of representative-samples. The waveform designated count exhibits a logic state coincident with the occurrence of the L-LSB's during each CYCLE period and is a logic zero for the MSB's of the respective samples. The lastmost waveform XND is a logic zero for the initial portion of each cycle period and changes to a logic one during the $N^{th}$ or sign-bit period and remains at a logic one state for substantially the remainder of the cycle period. The signal XND is provided to implement sign-bit replication.

Referring to FIG. 2 the control element 70 generates the waveforms CLOCK P, CLOCK N, CYCLE PULSE, COUNT and XND from the system CLOCK. One skilled in the art of digital signal processing will readily be able to develop such signals and, thus, the details of control element 70 will not be discussed.

The circuitry of FIG. 2 exclusive of the elements drawn in phantom, exemplifies square root circuitry which may be used in the FIG. 1 expander. Adding the elements shown in phantom conditions the apparatus for more general applications.

The apparatus, including the elements drawn in phantom, performs iterations of the equation $$E_{K+1} = E_K + \tfrac{1}{2}(S_R - E_K^2) \cdot 2^{-[Int(log_4(S_R))]} \quad (2)$$

where $E_{K+1}$ is the present estimate of the square root of sample $S_R$, $E_K$ is the previous estimate, and Int($log_4(S_R)$) is the integer part of the logarithm to base 4 of the sample $S_R$. The value $(S_R - E_K^2)$, provided by subtracter 38, is coupled to the threshold detector 68. When the value of $(S_R - E_K^2)$ is less than a predetermined value, indicating that the estimate is satisfactorily close enough to the actual square root of sample $S_R$, threshold detector 68 provides a control signal which is applied to one input terminal of the two input AND gate 66. The signal CYCLE PULSE is applied to a second input terminal of AND gate 66 which develops an output pulse coincident with the CYCLE PULSE signal to indicate that the iterative calculations are complete for the last sample. The signal from AND gate 66 is applied to multiplexer 32 to admit a new sample to the circuitry for calculating the square root. The signal from AND gate 66 is also coupled to various registers in the circuitry to reset their contents to zero to reinitiate the iteration process.

The general operation of the FIG. 2 circuit proceeds as follows. A sample $S_R$ is coupled from the terminal INPUT to the N-stage register 34 via multiplexer 32. The output of register 34 is coupled to subtracter 38 through the compensating delay register 36, and is also coupled to a second signal input of multiplexer 32. The sample $S_R$ is recirculated through register 34 via multiplexer 32 so that it is available for use during each iteration cycle.

When the N-bit sample $S_R$ is loaded into register 34 and each time it is recirculated in register 34, it is clocked into register 34 by the N-pulse clock signal CLOCK N. At the end of the CLOCK N burst of pulses the sample is positioned in the register with the LSB located at the output stage. The LSB of the sample is thus conditioned to be clocked out of register 34 coincident with the first pulse of CLOCK N during the next subsequent burst of pulses of CLOCK N.

Nominally the previous estimate of the square root of sample $S_R$ is stored in register 44. During the first iteration this value is zero. However, for all non-zero estimates the previous estimate $E_K$ in register 44 is squared in the squaring circuitry 51. The estimates $E_K$ are N-bit samples. In subtracter 38 it is desired that the N most significant bits of the squared sample ($E_K^2$) be subtracted from the N-bit sample $S_R$, that is, the precision of the 2N-bit squared sample be the same as the precision of the sample $S_R$.

Since registers 34 and 44 are clocked concurrently (at least for the beginning of each cycle) the bit alignment of sample $S_R$ with the N-MSB's of sample $E_K^2$ is accomplished by the interposition of delay register 36 between register 34 and subtracter 38. The N-LSB's of the 2N-bit squared samples, $E_K^2$, provided to subtracter 38, will subsequently be discarded.

In subtracter 38 the squared estimates from squaring circuit 51 are subtracted from the sample $S_R$ to produce the quantities $(S_R - E_K^2)$. The output samples from subtracter 38 are coupled to adder 42 through the variable delay register 40. Subtracter 38 is presumed to have an inherent delay of one sample bit period, and presume for the moment that the variable delay register 40 provides a delay of $VD_{MAX}$. The component $S_R$ of the quantity $(S_R - E_K^2)$ arrives at adder 42 delayed by D1 sample bit periods in register 36, one sample bit period in subtracter 38 and $VD_{MAX}$ sample bit periods in variable register 40 for a total of $D1 + VD_{MAX} + 1$ sample bit periods. One-half the value of $(S_R - E_K^2)$ is to be added to the value of the previous estimate $E_K$ from register 44 in adder 42. The sample $E_K$ from register 44 is therefore coupled to adder 42 through the compensating delay register 46 so that the LSB of the value $E_K$ occurs at the adder 42 one sample bit period after the LSB of the quantity $(S - E_K^2)$. Therefore, register 46 is designed to provide $D1 + VD_{MAX} + 2$ sample bit periods of delay to the samples $E_K$, so that the samples $E_K$ and $(S - E_K^2)$ applied to adder 42 are in the ratio of $1:\tfrac{1}{2}$.

As described, adder 42 produces samples $E_{K+1}$ which correspond to the values $$E_{K+1} = E_K + \tfrac{1}{2}(S_R - E_K^2). \quad (3)$$

Iterations of this equation will converge to the square root values of the samples $S_R$ in relatively few iterations for sample values $0 < S_R \leq 2$. However, for larger values of $S_R$ equation (3) converges more slowly or not at all. This shortcoming is overcome by multiplying the quantities $(S_R - E_K^2)$ by 2 raised to the negative exponent [INT-($log_4(S_R)$)+1].

The "1" term in the exponent arises from the factor $\tfrac{1}{2}$ in equation (3). The exponent is a whole number since it includes the integer 1 plus only the integer part of the logarithm of the sample $S_R$. In effect, the values $(S_R - E_K^2)$ are multiplied by reciprocal multiples of two which may be accomplished by advancing in time the bit positions of the sample quantities $(S_R - E_K^2)$ relative to the bit position of the estimates $E_K$.

The multiplication of the sample quantities $(S_R - E_K^2)$ by 2 raised to the negative exponent [INT-($log_4(S_R)$)+1] is accomplished in the variable delay register 40 which selectively reduces the number of delay stages in response to control signals provided by latch 64.

The variable delay register 40 control signals are developed as follows. It is known that the integer part of the logarithm to base two of a binary number corresponds to one less than the number of the bit position of the most significant bit exhibiting a logic one state counting from the LSB. For example, the integer part of the logarithm base 2 of the eight-bit sample representing the number 31 (00011111) is four (one less than the bit position 5 which is the most significant 1). In order to determine the characteristic or integer part of the logarithm base 2 of the samples $S_R$ it is therefore only necessary to count the bit positions of the sample having logic one states. The integer part of the logarithm to base 4 of the sample $S_R$ is determined by dividing the integer part of the logarithm to base 2, of the sample, by 2.

In FIG. 2, the sample $S_R$ is coupled to element 58 which examines the sample to determine the bit position having the most significant logic one state, and provides a binary output representing one less than this value. The binary output from element 58 is divided by 2 in element 60 to generate the integer part of the logarithm base 4 of the sample $S_R$. This value is coupled to the encoder 62 which may be a look up table (ROM) programmed to provide the control signals for the variable delay register 40 to select the requisite delay interval. It will be appreciated by those skilled in the art of digital processing that the divide-by-two function of element 60 may be programmed into the encoder 62. Alternatively, the divide-by-two function may be eliminated entirely at the expense of converging time. The control signals are stored in the latch 64 under control of the signal XND after all of the sample bits have been examined. The control signals are transferred into latch 64 under control of the CYCLE PULSE signal so that they are available to the variable delay register for the entirety of the successive cycle period when the contribution from the respective sample is applied to register 40.

The details of the squaring circuitry 51 will now be discussed. The squares of the previous estimates do not have to be calculated with full precision. Thus, some hardware savings may be realized by estimating the values of the squares of $E_K$. The respective estimate samples EK can be represented by the values (A+B) as discussed above. The exact squares of these values are $A^2+2AB+B^2$. To determine the exact squares an N×N bit multiplier is required. However, a good approximation of the square may be realized by calculating the values $A^2+2AB$ which are in error by the amount corresponding to $B^2$. The square of an N-bit number is a 2N-bit number. If the 2N-bit squared number is truncated back to an N-bit number, the portion of the squared sample lost by such truncation corresponds substantially to the value of $B^2$. Thus, estimating the square as the value $A^2+2AB$ will not introduce significant error and may be accomplished with, in this case, an N×(N−L) bit multiplier where L is the number of bits representing the value B.

The squaring circuitry includes register 44 parallel latch 48, adder 52, AND gate 54 and the multiplier 50 which may be a 74LS384 serial/parallel multiplier available from Texas Instruments Inc., Dallas, Tex. In this instance there are eight parallel input multiplier bits resulting in square estimates of (N+8)-bits.

Register 44 is segmented into two parts A and B of (N−L)-bits and L-bits respectively. At the beginning of a cycle period segment A contains the (N−L)-MSB's of the N-bit estimate sample $E_K$ and segment B contains the L-LSB's of the sample $E_K$. The (N−L)-MSB's, representing value A of the sample having value (A+B), are coupled via parallel output ports to the latch 48 which stores the (N−L)-MSB's and applies them for the duration of a cycle period to the parallel input connections of serial/parallel multiplier 50. The entire N-bit sample $E_K$ corresponding to the value (A+B) is then clocked bit seriatum into one input of adder 52 and one input of AND gate 54. AND gate 54 is enabled by the signal COUNT to pass only the L-LSB's of the sample to a second input of adder 52. Adder 52 outputs bit seriatum a sample corresponding to the value (A+2B) which is coupled to the serial input of the serial/parallel multiplier 50. Responsive to the value A and A+2B applied respectively to the parallel and serial input ports multiplier 50 produces the estimates of $E_K^2$ equal to $A^2+2AB$.

In the illustrated embodiment the samples $E_K$ are segmented into 12-LSB's and 8-MSB's. The product $A^2+2AB$ therefore has N+(N−L) or 28 bits. Relative to the first clock pulse of the cycle the product is delayed one bit period due to a one bit delay in adder 52. Thus, the 20 MSB's of the products $A^2+2AB$ arrive at subtracter 38 delayed by nine bit periods. In this example, compensating delay register 36 must therefore provide a delay of nine sample bit periods.

Depending on the particular multiplier selected, it may be required to continue to clock the multiplier for a period after the entire serial sample has been clocked into it (nine sample bit periods in the above example). During this interval it may also be necessary to replicate the sign-bit of the sample being multiplied. To effect the replication, register 44 is configured to have a transparent latch 44a coupled to its output. The transparent latch in this instance is controlled by the signal XND and passes unaltered, the bits clocked through the register 44 when signal XND is in a logic low state. However, when signal XND goes to a logic one state (when the sign bit is present at the serial output of register 44) latch 44a captures the sign bit and continues to output its logic state for the entire period signal XND remains at the logic one state effectively replicating the sign bit. Transparent latch 44a may be similar to the type designated SN 74LS373 which is available from Texas Instruments Inc.

During a particular cycle, register 44 provides estimate $E_K$ bit seriatum to the multiplier 50, and is also concurrently loaded bit seriatum with estimate $E_{K+1}$. However, when register 44 begins clocking estimate $E_K$ to multiplier 50, estimate $E_{K+1}$ is not yet available to the input of register 44 because of the delay incurred by the contributing components to $E_{K+1}$ in, for example, register 46 and adder 42. In order for estimate $E_{K+1}$ to be loaded into register 44 properly bit-justified for application to multiplier 50 at the beginning of the subsequent cycle, register 44 must be clocked by a number of pulses in excess of the number of delay stages in the register. Therefore, register 44 is clocked with CLOCK P. In the illustrative embodiment of FIG. 2, the delay in register 46 is 18 clock pulses, two plus seven delays for $VD_{MAX}$ and nine delays for D1. Adder 42 contributes an additional one bit period delay. Thus, CLOCK P must provide a burst of 20+18+1 or 39 clock pulses.

Information is clocked into register 44 during the initial 19 pulses of CLOCK P. This information corresponds to the LSB's of the squared sample $E_K^2$. These bits are clocked through register 44 and lost to effect the truncation of the squared sample. (The sample bits are lost by virtue of the transparent latch 44a blocking the output of register 44 after N clock pulses.)

Figure 3:
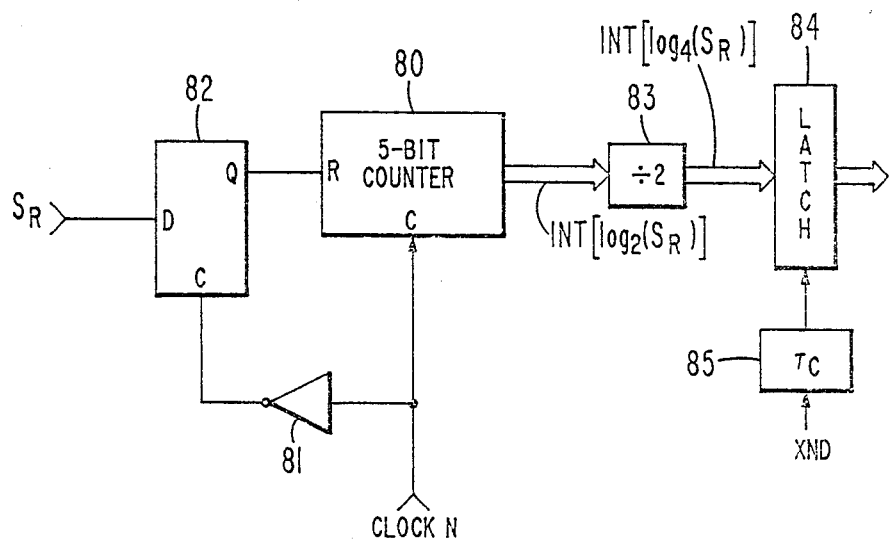
FIG. 3 is a block diagram of apparatus for calculating the characteristic part of a logarithm of a serial-bit binary sample which may be utilized in the FIG. 2 apparatus.

FIG. 3 illustrates a particular circuit for determining the logarithm base 2 of the samples $S_R$. This circuit operates for samples having values between zero and one, thus, the presumption is made that the system of FIG. 1 is supplied with samples, S, having values −1<S<+1. In this instance, since the samples, S, are squared in circuitry 14, the samples $S_R$ applied to the square root circuitry 18 will have values of $0<S_R<1$.

For numbers less than one the characteristic part of the logarithm base 2 corresponds to the bit position of the first bit after the binary point which exhibits a logic one state. The binary point in this instance occurs between the MSB and bit N−1. The characteristic or integer part of the logarithm may therefore be determined by counting the number of logic zeroes in the samples $S_R$ between the last occurring logic one bit and the binary point.

In FIG. 3 counting is performed by a five-bit counter 80 clocked by CLOCK N. The samples $S_R$ are coupled to the data input terminal of a "D" type flip-flop 82, the output of which is coupled to the reset control of the counter 80. Flip-flop 82 is clocked by the complement of CLOCK N provided from inverter 81. in this arrangement counter 80 counts pulses of CLOCK N until a logic one bit occurs in sample $S_R$ which sets flip-flop 82 and in consequences thereof resets counter 80 to zero. Counter 80 is therefore reset by every occurring logic one bit in the applied sample. At the end of the burst of CLOCK N pulses counter 80 contains a count value equivalent to the number of zeroes in sample $S_R$ occurring after the most significant logic one bit. Note, however, that counter 80 counts one extra zero corresponding to the sign bit so that in effect the count corresponds to the position of the first logic one bit after the binary point, which is the desired value The count output from counter 80 is a parallel bit sample corresponding to the integer part (base 2) of the logarithm of the sample $S_R$ and is coupled to the divide-by-two circuit 83. Divide-by-two circuit 83 translates the logarithm (base 2) characteristic to the logarithm (base 4) characteristic and may be realized by a simple hard-wired bit shift. The output of the divide-by-two circuit is applied to a parallel-bit latch 84 which is loaded with the characteristic at the end of sample $S_R$ by the control signal XND. Signal XND may be delayed by a delay element 85 to provide sufficient time for the count to reach the latch 84 before it is clocked to store the characteristic. The output of latch 84 is coupled to e.g. the encoder 62.

In the expander apparatus of FIG. 1 it is presumed that the (L−R) digital samples will occur at a rate of approximately 300 KHz. The information bandwidth of the (L−R) samples is, however, nominally limited to 20 KHz. After passing through the squaring circuit 14 and the averaging circuit 16, the squared and averaged samples are further limited to a bandwidth less than 1 KHz. As a result the samples applied to the square root circuitry do not change appreciably over many sample periods. In consequence of this the cycle PULSE clock of the square root circuitry of FIG. 2 can be established at the sample rate and it is not necessary to iterate the calculation of the square root of each successive sample $S_R$. Thus, in implementing the square root circuitry of FIG. 2 in the FIG. 1 apparatus, the threshold detector 68 and multiplexer 32 may be eliminated. The iterations of the slowly changing input samples $S_R$ will occur inherently due to the relatively fast sample rate compared to the bandwidth of the sample information.

Referring again to FIG. 2, an alternative embodiment is indicated by the phantom arrow 31. In this embodiment the output estimate OUT ($E_{K+1}$) from adder 42 is coupled to the logarithm circuit 58 rather than the input samples $S_R$. One further change is desirable, though not absolute necessary, and that is the elimination of the divide-by-two circuit 60. In this embodiment the operation of the circuit elements remains the same as described above but the iteration function is changed.

The equation that is iterated is expressed by $$E_{K+1} = E_K + \tfrac{1}{2}(S_R - E_K^2) \cdot 2^{-INT(log2(EK))}. \quad (4)$$

One skilled in the art of digital signal processing will readily be able to develop alternative embodiments within the spirit of the invention. For example, a parallel bit square root processor may be assembled by substituting a parallel bit adder and subtracter for elements 42 and 38, a parallel bit squarer for circuitry 51 and a parallel-bit bit shifter for variable delay register 40, and substituting latches for the registers where necessary.

In addition, for certain applications, it may be desirable to detect the occurrence of negative sums at the output of adder 42. For negative sums the output values OUT may be set to zero, and the values input to register 44 may be set to a predetermined value such as $\tfrac{1}{2}$.

What is claimed is:

1. Apparatus for calculating the square roots of binary samples, comprising:
   a signal input terminal for supplying said binary samples;
   storage means having an input terminal and an output terminal, for storing samples therein;
   sample combining means having a first input terminal coupled to the output terminal of said storage means, an output terminal coupled to the input terminal of said storage means and having a second input terminal;
   squaring means coupled to the output terminal of said storage means for generating samples having values representing the squares of samples coupled thereto, and having an output terminal;
   sample differencing means having first and second input terminals coupled to said signal input terminal and to the output terminal of said squaring means, respectively, and having an output terminal; and
   means for coupling the output terminal of said sample differencing means to the second input terminal of said signal combining means; and
   wherein values representing the square roots of said binary samples are provided at the output terminal of said sample combining means.

2. The apparatus set forth in claim 1 wherein said means for coupling includes:
   means coupled between said sample combining means and said sample differencing means and having a control input terminal, for changing the bit significance of samples applied thereto responsive to a control signal;
   means coupled to said signal input terminal for generating said control signals representing the characteristics of the logarithm (base 2) of said binary samples; and
   means for coupling said control signals to said control input terminal.

3. The apparatus set forth in claim 2 wherein said bit significance changing means effects a multiplication of samples applied thereto by a factor 2 exp[−INT(log4($S_R$))] where $S_R$ is the value of respective binary samples applied to said signal input terminal, and INT denotes the integer part of log4($S_R$).

4. The apparatus set forth in claim 1 wherein said means for coupling includes:
   means coupled between said sample combining means and said sample differencing means and having a control input terminal, for changing the bit significance of samples applied thereto responsive to a control signal;
   means coupled to the output terminal of said sample combining means for generating said control signals, representing the characteristic of the logarithm (base 2) of samples produced from said combining means; and means for coupling said control signals to said control input terminal.

5. The apparatus set forth in claim 1 wherein such apparatus processes N-bit serial-bit binary samples (N being an integer) and said storage means comprises:

serial-bit shift register means arranged to load samples bit-seriatum and to segment N-bit samples into L least significant bits (LSB's) and (N−L) most significant bits (MSB's) (L being an integer), said shift register mean having provision for outputting in parallel the (N−L) MSB's of the N-bit samples and having a serial-bit output terminal for outputting the N-bit samples bit-seriatum.

6. The apparatus set forth in claim 5 wherein the squaring means comprises:

a serial-parallel multiplier having a parallel-bit input port and a serial-bit input port, and having an output port coupled to said sample differencing means;

means for coupling said (N-L)-MSB's from said storage means to said parallel-bit input port; and means for coupling the serial-bit input port of the serial-parallel multiplier to the serial-bit output terminal of the shift register means.

7. The apparatus set forth in claim 6 wherein the means for coupling the output terminal of said sample differencing means to the second input terminal of said signal combining means includes a serial shift register having input and output terminals coupled to said differencing and combining means respectively.

8. The apparatus set forth in claim 7 wherein said serial shift register coupled between the differencing and combining means further includes a control signal input port and said serial shift register provides a variable delay period responsive to control signals applied to said control signal input port.

9. The apparatus set forth in claim 8 wherein the means for coupling the output terminal of said sample differencing means to said sample combining means further includes:

means, coupled to said signal input terminal for applying binary samples, for generating a signal representing the characteristic part of the logarithm (base 2) of said binary samples; and means, coupled to said means for generating said characteristic part for generating said control signals to control the delay period of said serial shift register.

10. The apparatus set forth in claim 8 wherein the means for coupling the output terminal of said sample differencing means to said sample combining means further includes:

means, coupled to the output terminal of said sample combining means, for generating a signal representing the characteristic part of the logarithm (base 2) of said binary samples; and means, coupled to said means for generating said characteristic part, for generating said control signals to control the delay period of said serial shift register.

11. Apparatus for estimating the square root of a binary sample comprising:

a sample input terminal for applying said binary sample;

storage means having an input and an output terminal, for storing a sample corresponding to an estimate of the square root of said binary sample;

sample squaring means, having an output terminal, an input terminal coupled to the output terminal of said storage means, for generating samples representing the squares of estimates provided by said storage means;

sample combining means coupled to said sample input terminal and respective output terminals of said storage and squaring means for combining said estimate, the square of said estimate and said binary sample in the ratio 2:−1:1;

means for coupling combined samples from said combining means to the input terminal of said storage means; and wherein estimates of the square root of said binary sample are provided at the output terminal of said sample combining means and at the output terminal of said storage means.

* * * * *